(12) United States Patent
Hay

(10) Patent No.: US 8,056,217 B2
(45) Date of Patent: Nov. 15, 2011

(54) TWIST-LOCK HANDLING SYSTEM

(75) Inventor: Cameron Hay, Singapore (SG)

(73) Assignee: NSL Engineering Pte Ltd., Singapore (SG)

( * ) Notice: Subject to any disclaimer, the term of this patent is extended or adjusted under 35 U.S.C. 154(b) by 1127 days.

(21) Appl. No.: 11/661,445

(22) PCT Filed: Aug. 22, 2005

(86) PCT No.: PCT/AU2005/001258

§ 371 (c)(1),
(2), (4) Date: Jul. 20, 2007

(87) PCT Pub. No.: WO2006/024071

PCT Pub. Date: Mar. 9, 2006

(65) Prior Publication Data

US 2008/0093869 A1    Apr. 24, 2008

(30) Foreign Application Priority Data

Aug. 30, 2004    (AU) ............................... 2004904942

(51) Int. Cl.
*B23P 19/00* (2006.01)
*B63B 25/00* (2006.01)
*B66C 1/00* (2006.01)

(52) U.S. Cl. .......................... 29/700; 410/82; 294/81.53

(58) Field of Classification Search ............... 29/700, 29/712, 783, 791, 822, 823, 824, 243.5, 243.56, 29/243.526; 410/80, 82, 83, 73, 76; 269/900; 294/81.53

See application file for complete search history.

(56) References Cited

U.S. PATENT DOCUMENTS 3,980,185 A * 9/1976 Cain ............................. 206/509

FOREIGN PATENT DOCUMENTS

| GB | 2 183 713 | 6/1987 |
| JP | 59-213591 | 12/1984 |
| JP | 1-321294 | 12/1989 |
| WO | WO 01/12469 | 2/2001 |

* cited by examiner

*Primary Examiner* — Jermie Cozart
(74) *Attorney, Agent, or Firm* — Dickstein Shapiro LLP

(57) ABSTRACT

An apparatus (10) for either securing twist-locks (400) to shipping containers (402) or releasing them therefrom or both, comprises a cradle (11) adapted to receive at least one shipping container and at least one manipulation device (14) operative to secure a twist-lock to the shipping container or release it therefrom, the manipulation device comprising an engagement device (27) operative to engage and rotate at least a portion of the twist-lock so as to secure the twist-lock in the shipping container or to release it therefrom. The manipulation device may form part of a twist-lock handling assembly (12) which includes a storage system for twist-locks (16) and a guide assembly (15) for feeding twist-locks into and out of register with the manipulation device (14).

32 Claims, 15 Drawing Sheets

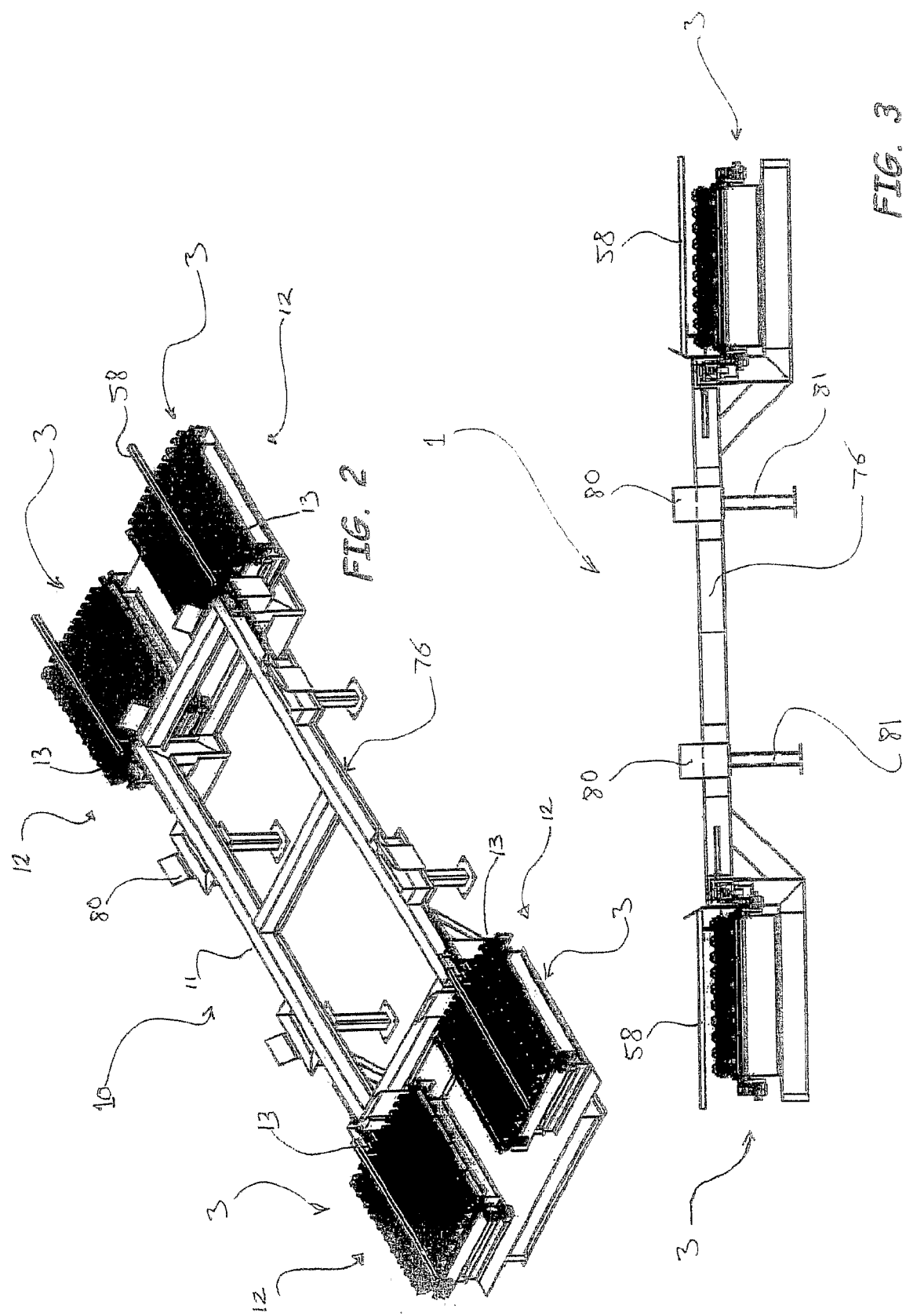

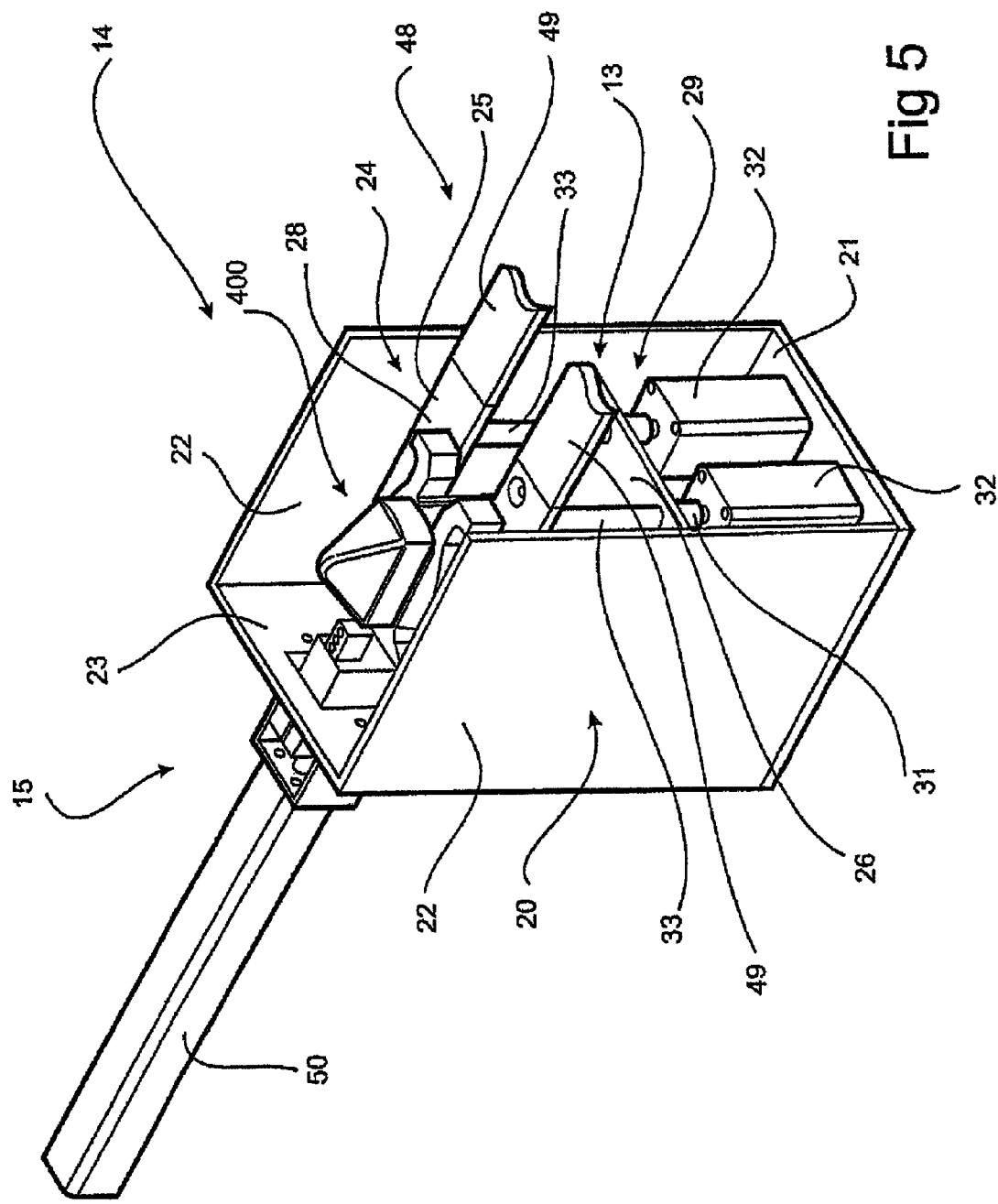

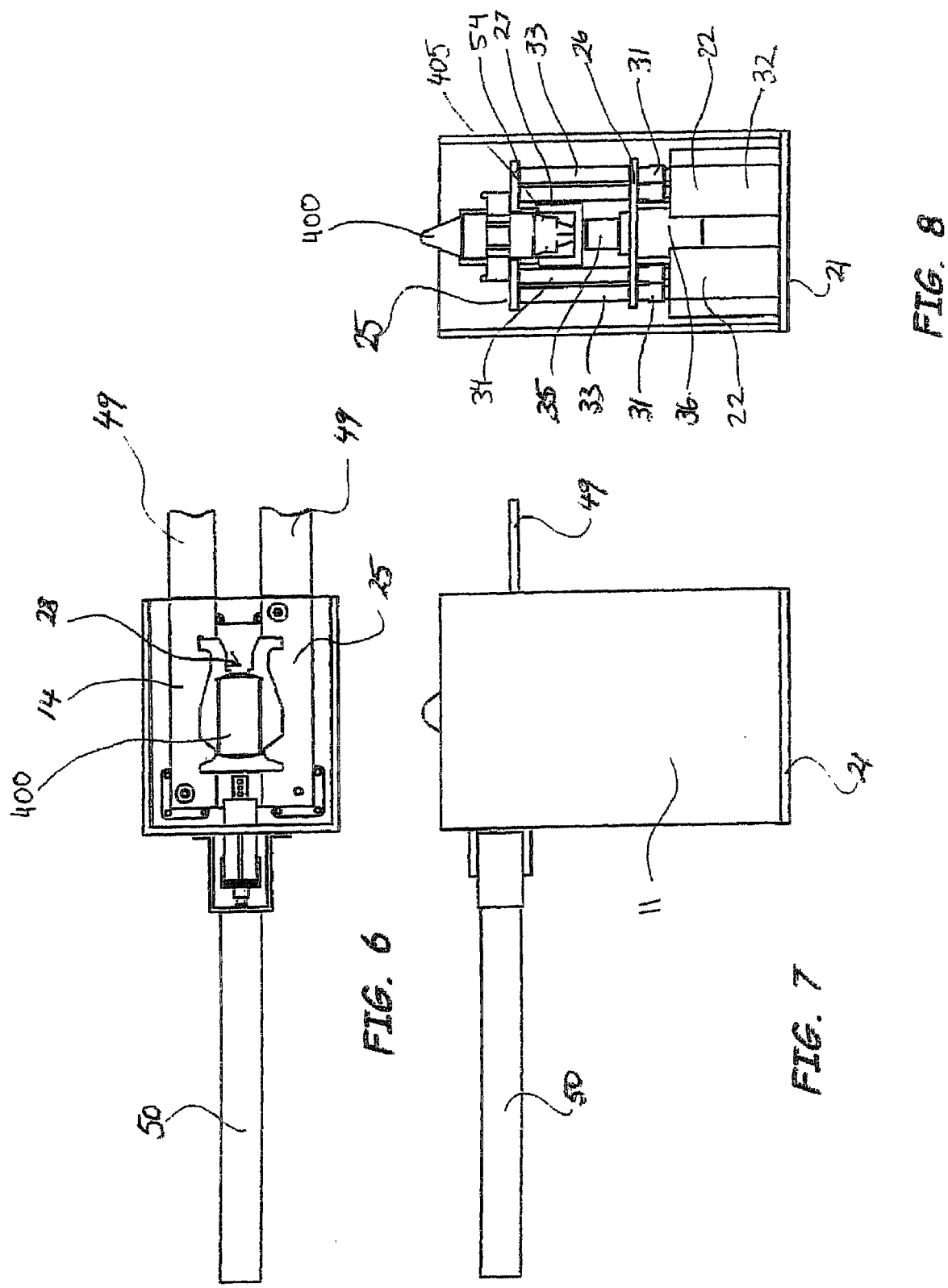

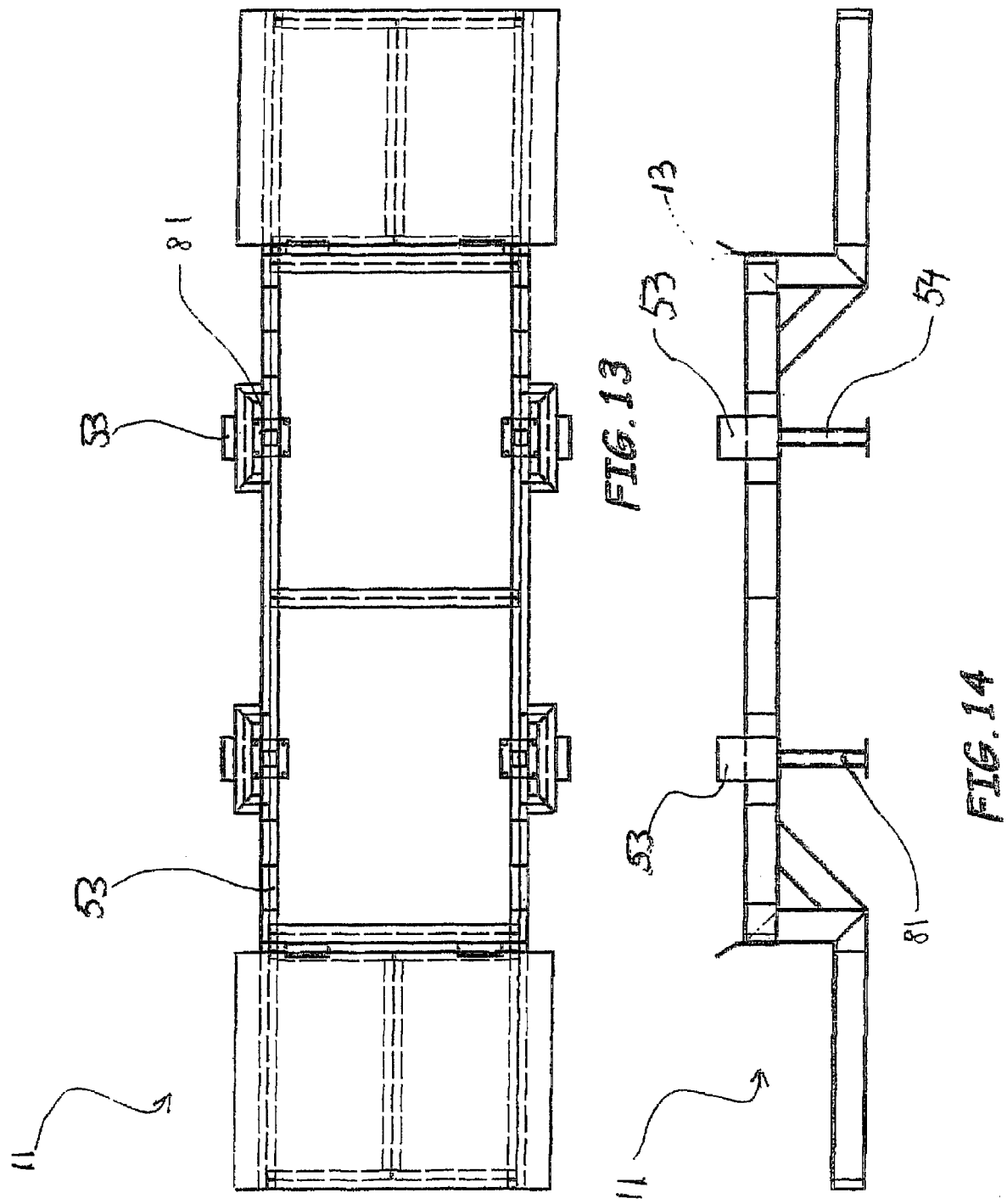

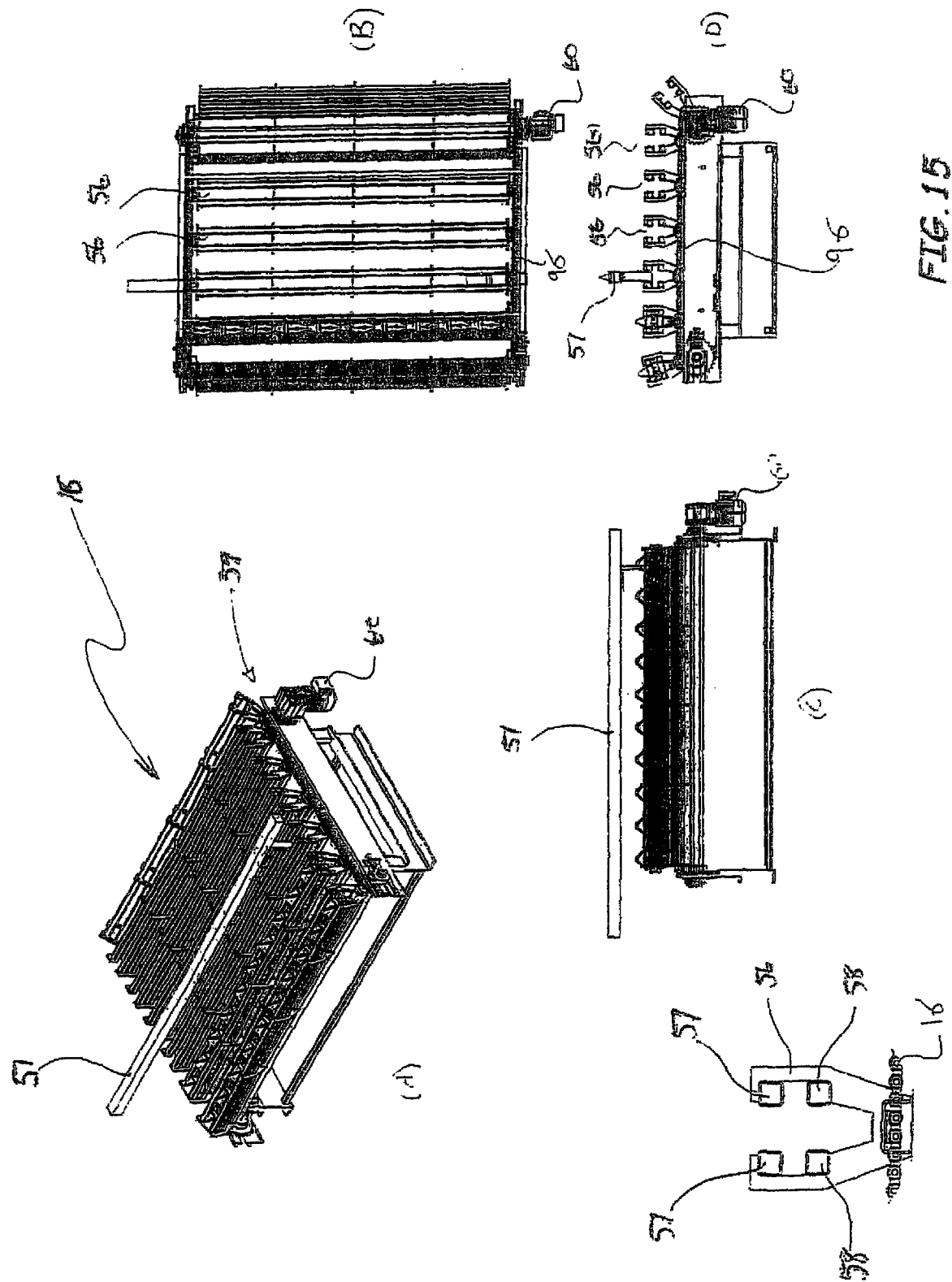

TWIST-LOCK HANDLING SYSTEM

TECHNICAL FIELD

The present invention relates generally to apparatus for handling twist-locks used in securing shipping containers for transport. Aspects of the invention relate to apparatus for securing the twist-locks to a shipping container and/or for releasing those twist-locks from the container. Other aspects of the invention relate to storage of twist-locks.

In the context of the invention, the term "twist-lock" is to be understood to relate to any coupling device used in association with shipping containers to secure those containers for transport, regardless of the mechanism by which those coupling devices inter-engage with the shipping container and/or the structure to which they are secured.

BACKGROUND OF THE INVENTION

Twist-locks are used for securing shipping containers to ships and to each other. Twist-locks are mounted on the bottom and top of shipping containers and thereby multiple containers can be joined in a vertical stack. When shipping containers have been lifted off the ship by a crane the twist-locks must be removed before the containers are taken to another location. Furthermore, when the containers are loaded onto a vessel, twist-locks must be fitted at the wharf to secure containers on board the vessel. Typically, securing or removing twist-locks is via manual handling of the twist-locks below a shipping container held approximately 1 to 1.8 metres above the ground by the crane.

This operation is dangerous as the stevedore must manually handle the twist-locks which are quite heavy and work under or adjacent suspended loads in a high traffic area. It is also inefficient as it can take 1 to 3 minutes to fit the twist-locks, thereby slowing the crane cycle time. It is also labour cost intensive since 2 men are often allocated to undertake such a task.

SUMMARY OF THE INVENTION

According to a first aspect of the present invention there is provided a manipulation device for either securing a twist-lock to a shipping container or releasing it therefrom or both, the device comprising engagement means operative to engage and rotate at least a portion of the twist-lock so as to secure the twist lock in the shipping container or to release it therefrom.

In one form, the manipulation device further comprising a support member disposed above the engagement means, the support member being arranged to receive and support a mid region of a twist-lock whilst allowing a lower portion of the supported twist-lock to project below the member to be engagable with the engagement means. In one form the support member is in the form of a plate.

The support member is arranged to assist in securing and/or releasing the twist-locks from the shipping containers. In one form, the support member may prevent rotation of a mid region of the twist-locks. In another form, the twist-locks may initially locate on the support member and then be lifted from the support member before being rotated by the engagement means. Similarly, the twist-locks may be caused to drop onto the support member when they are released from the shipping container.

In one form, at least one of either the engagement means or the support member is movable in the direction of the axis of rotation of the engagement means. In one form, both are movable. By providing the facility to allow adjustment in the height of one or both of the engagement means and the support member allows the manipulation device to cater for twist-locks of different shape and/or size. It also allows for ease of engagement and/or disengagement of the engagement means from the twist-lock handled by the manipulation device.

In one form, the engagement means is movable relative to the support member in the direction of the axis of rotation of the engagement means.

In one form, the manipulation device further comprises a frame incorporating the engagement means and the support member, wherein in use, the frame is movable in the direction of the axis of rotation of the engagement means. In a particular form, the manipulation device further comprising a housing wherein the inner frame is disposed within the housing and movable relative to the housing in the direction of the axis of rotation of the engagement means.

The manipulation device may also comprise a height adjustment assembly operative to move the inner frame relative to the housing in the direction of the axis of rotation of the engagement means. In a particular form, the height adjustment assembly is one or more hydraulic piston cylinder assemblies.

As there is no international standard for twist-locks, different systems of twist-locks have been developed and are currently in use. These twist-locks often have different external geometries and/or are designed to rotate different amounts to release from, or engage with, the shipping container. In one form, the engagement means and/or support member is designed to accommodate only some of the available types of twist-locks. In this arrangement the external geometry of the manipulation device may be fixed. In another form, the manipulation device is designed to be used in association with a broader range of twist-locks.

To cater for different types of twist-locks, the support member may be interchangeable with at least one other support member of different shape. Further, in one form, the engagement means is interchangeable with at least one other engagement means of different shape to accommodate different types of twist-locks.

In an alternative form, component parts of the manipulation device are reconfigurable.

In one form, where the engagement device is reconfigurable, the engagement means comprises a plurality of elements with each of the elements being movable between a retracted and an extended position. With this arrangement, the retracted elements define a recess that in use is operative to receive a twist-lock. Accordingly, by varying the configuration of retracted elements, it is possible to reconfigure the shape of the recess thereby allowing twist-locks of different shape to be accommodated by the engagement means. In another form, the engagement mean comprises plate elements that are extendable so as to allow for limited reshaping of the engagement means.

In a particular embodiment, the engagement means is in the form of jaws which are operable to grip the twist-lock disposed in the manipulation device.

In some instances, the twist-locks may incorporate a locking mechanism that needs to be released to allow rotation of twist lock. To cater for these types of twist-locks, the manipulation device may further comprising an actuator operative to release the locking mechanism.

In one form, the engagement means maintains contact with the twist-lock portion purely through the geometry of the respective part. Alternatively, the engagement means may utilise other mechanisms to either engage with the twist-lock or affect movement of that twist-lock to allow it to move between its engaged and released conditions. For example, the engagement means may utilise a magnet, such as permanent magnet or an electromagnet. Alternatively, a vacuum system may be employed to assist, or affect, engagement or movement of the twist-lock.

In accordance with embodiments disclosed above, a manipulation device is provided that can be used in a twist lock handling assembly for use in automating the securing and releasing of a broad range of twist-locks.

In a further aspect, the invention is directed to such a twist lock handling assembly incorporating at least one manipulation device in any form described above.

In one form, the twist-lock handling assembly further comprises a guide assembly for guiding twist-locks into and out of engagement with the manipulation device. In a particular form, the guide assembly includes a track along which twist-locks are able to move whilst being stably supported and a transport mechanism for moving the twist-lock along the track. In a particular form, the guide assembly is arranged to move the twist-locks into and out of registry with the support member of the manipulation device.

In one form, the twist-lock handling assembly further comprises storage means, and wherein the guide assembly delivers twist-locks that have been discharged from the engagement means to the storage means for storing of obtaining stored twist-locks from the storage means for feeding to the manipulation device.

In one form, the storage means comprises at least one rack for receiving a plurality of twist-locks. In another form, the storage means comprises a plurality of racks mounted on a conveyor operative to move the racks into and out or register with the transport means for delivery of twist-locks from the racks to the transport means or for receiving twist-locks from the transport means.

In one form, the racks are in the form of a removable storage magazine.

In one form, the assembly further comprises drive means operative to rotate the engagement means to allow rotation of a twist-lock engaged by the engagement means.

According to a further aspect of the present invention there is provided a storage device configured for storing twist-locks and/or for receiving twist-locks from, the device described above.

In one form, the storage device comprises at least one rack for receiving a plurality of twist-locks.

In one form, the storage device comprises a plurality of racks mounted on a conveyor operative to move the racks into and out of register with the transport means, for delivery of twist-locks to the transport means or for receiving twist-locks from the transport means.

In one form, the rack comprises at least two parallel elongate members configured to slidably receive at least one twist-lock. In a preferred embodiment the rack comprises four parallel rails, configured to slidably engage at least one twist-lock such that the twist-lock can only disengage from the rails at the ends of the rails.

In one form, the storage device is constructed such that the or each rack is in the form of a removable storage magazine.

In one form the conveyor is driven by a remotely-controlled motor.

According to a further aspect of the present invention there is provided an apparatus for either securing twist-locks to shipping containers or releasing them therefrom or both, the apparatus comprising a cradle adapted to receive at least one shipping container and at least one manipulation device operative to secure a twist-lock to a shipping container or to release it therefrom, the manipulation device being registrable with at least one twist-lock mounting location on the shipping container.

In one form, the manipulation device is in accordance with any form described above. In one form, the apparatus further comprises a plurality of manipulation devices mounted to the cradle.

In one form, the apparatus further comprises one or more twist-lock handling assemblies according to any form described above, the or each twist-lock assembly incorporating one of the manipulation devices.

In one form, the at least one manipulation device or a component part of the manipulation device is removable from the apparatus so as to enable substitution of the device or part with at least one other manipulation device or part to accommodate different types of twist-locks.

By allowing the manipulation device or component parts to be removable from the apparatus, it allows the apparatus to utilise a plurality of different types of manipulation devices so as to increase the range of twist-locks which can be catered for by the apparatus. In one form, the manipulation devices or component part may be manually removed and replaced. In an alternative form, this process may be automated. For example, in the latter arrangement, a range of a manipulation devices may be mounted on a magazine, or carousel which allows for changing of the manipulation devices in the apparatus.

In one form, the apparatus is configured to allow the at least one manipulation device to move relative to the cradle to at least two twist-lock mounting locations on a shipping container.

In a particular embodiment, the cradle is substantially rectangular and is adapted to receive one larger container or two smaller containers.

In one form, the cradle is formed from first and second independent sections, each section being arranged to receive a container of predetermined size.

In a particular embodiment, the cradle includes dampeners operative to reduce impact loading on the cradle induced on the locating of shipping containers on the cradle. In the arrangement where the cradle is formed from cradle sections, each cradle section includes dampeners operative to reduce impact loading on that cradle section induced on the locating of shipping containers on that cradle section.

In another embodiment, the cradle further comprises guiding elements for guiding the respective container or containers into position on the cradle. Typically, embodiments may be constructed such that the cradle further comprises crane attachment portions to allow the container to be lifted by a crane.

In one form, the various components of the apparatus are driven by hydraulic actuators and are centrally controlled either on the wharf deck or by a crane operator. In this latter arrangement, the operation of the apparatus may be conducted by the crane operator who is in charge of lifting the shipping containers on and off the vessel. As such, the use of the apparatus in at least a particular embodiment can substantially reduce labour input in twist-lock handling and has the opportunity to substantially improve cycle times for the wharf cranes.

BRIEF DESCRIPTION OF THE DRAWINGS

It is convenient to hereinafter describe embodiments with reference to the accompanying drawings. The particularity of the drawings and the related description is to be understood as not superseding the broad description of the drawings.

In the drawings:

FIG. 2 is a perspective view of a twist-lock handling apparatus;

FIG. 3 is side view of the apparatus of FIG. 2;

FIG. 5 is a perspective view of a twist-lock manipulation device that forms part of one of the twist-lock handling assemblies for use in the apparatus of FIG. 2;

FIG. 6 is a plan view of the device of FIG. 5;

FIG. 7 is a side elevation of the device of FIG. 5;

FIG. 8 is an end elevation of the device of FIG. 5;

FIG. 13 is a plan view of the cradle of FIG. 12;

FIG. 14 is a side elevation of the cradle of FIG. 12;

FIGS. 15A to D are a perspective view, plan view, front view and side view of a storage system forming part of one of the twist-lock handling assemblies used in the apparatus of FIG. 2 and FIG. 16E is an end view of one of the racks of the storage system;

DETAILED DESCRIPTION OF THE EMBODIMENTS

Figure 1:
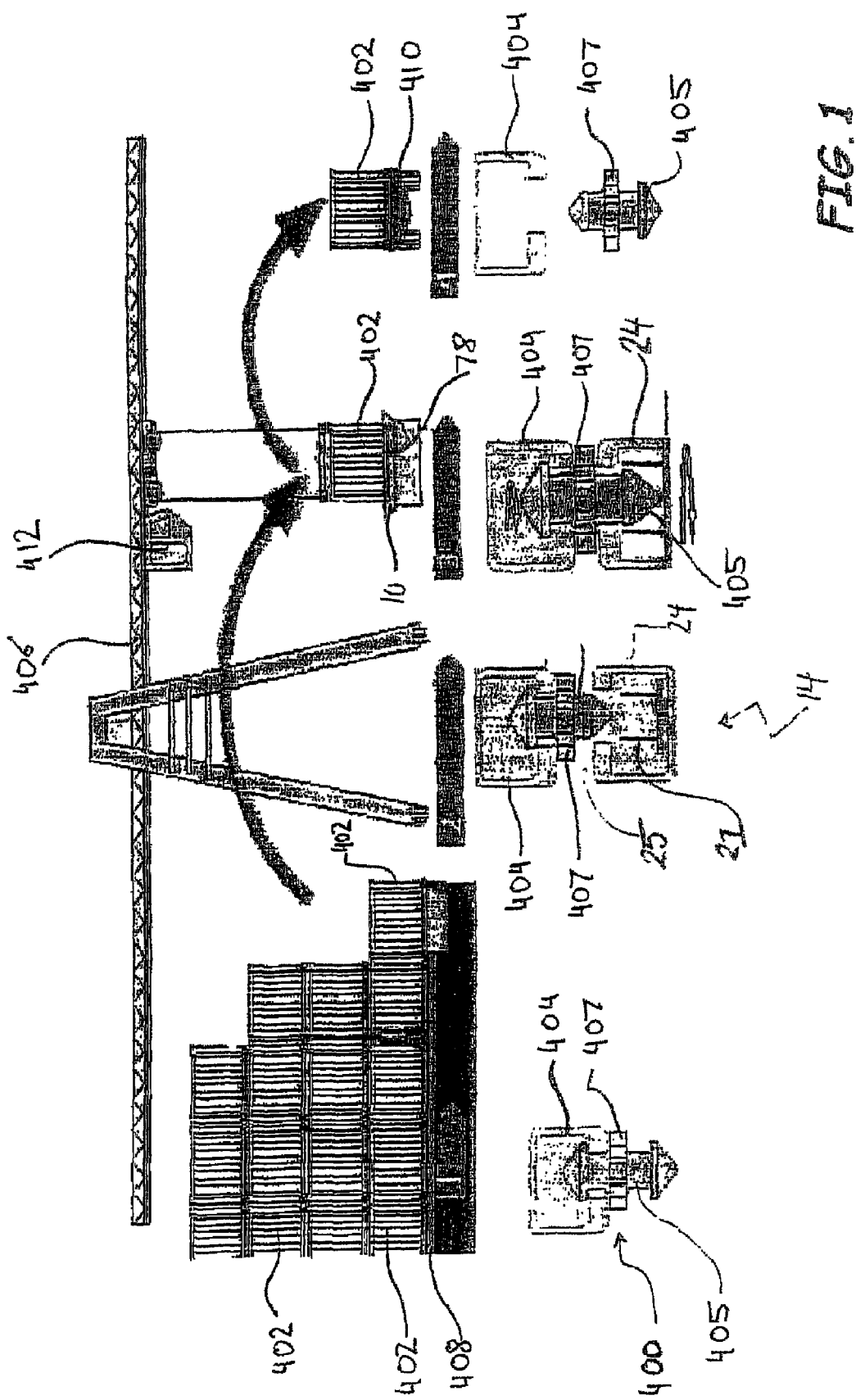
FIG. 1 is a schematic view of the four stages of container handling at a wharf.

FIG. 1 shows the various stages of unloading a container 402 from a ship deck 408 using a twist-lock handling apparatus 10 that removes and places twist-locks from the corner casings 404 of the shipping container 402.

In a first and second stage, a wharf-side crane 406 lifts the top container 402 from a vertical stack of containers on the ship deck 408. The twist-locks 400 are used to lock the shipping containers 402 together in the vertical stack. In order to lift the top container the twist locks connecting it to the container beneath it are first released from the lower container in a conventional manner and remain with the top container 402.

In a third stage, the crane 406 moves the container 402 across the wharf until it is positioned above a twist-lock handling apparatus 10. The container 402 is then lowered onto the apparatus 10 and the twist-locks 400 which extend out of the respective lower four of the corner casings 404 are released from the container 402 by manipulation devices 14 (as will be described in more detail below). Once released, the twist-locks are then discharged to a respective storage system 16 for re-use and the apparatus 10 is then ready to receive a further container.

In a fourth and final stage, the container is then placed on the back of a truck 410 by the crane 406, or picked up by a straddle carrier and is ready to be transported to a desired location. According to this system, this whole operation may be controlled by a crane operator in the crane cockpit 412.

In the arrangement shown in FIG. 1, the apparatus 10 is located on the wharf. In an alternative arrangement (not shown), the apparatus may be suspended on a platform secured to the quay crane 406. In this way, the apparatus 10 can be moved in unison with the crane.

It also should be appreciated that the operation may also be done in reverse. A container being loaded onto a vessel is first placed on the apparatus 10, where the twist-locks received from the storage system 16 are fitted into the corner casings under operation of the crane operator. The container is then ready to be lifted onto the vessel to be secured in place.

FIGS. 2 to 5 illustrate the twist-lock handling apparatus 10. In general terms the apparatus has a cradle 11 which is designed receive the shipping containers 402. and a series of twist-lock handling assemblies 12. In the present case, these assemblies are disposed at each corner 13 of the cradle 11. Each assembly 12 includes three main components; a manipulation device 14, a guide assembly 15, and a storage system 16. In use, the manipulation device removes or secures twist-locks 400 with respect to the corner casings of the shipping containers 402, the storage systems store the twist-locks, while the guide assembly feeds twist-locks between the manipulation devices and the storage means.

To obtain a better understanding of it operation, it is convenient to describe these principle components of the apparatus 10 in more detail.

FIGS. 5 to 8 show the manipulation device 14 having a twist-lock 400 disposed therein. The device 14 includes an outer housing 20 having a base plate 21, side plates 22 that extend upwardly from the base plate and end plates 23 that also extend from the base plate, and interconnect the side plates 22. One of the ends plates (not shown in FIGS. 5 to 8 for clarity) includes an aperture to allow the twist-locks to be moved into and out of register with the manipulation device 14.

The device also includes an inner frame 24 comprising an upper support plate 25 for supporting a twist-lock 400, a lower support plate 26 which supports a rotatable engagement device 27 which is arranged to engage and rotate a lower portion 405 of the twist-locks 400 to cause its release from the container 402. The upper support plate 25 is located at the top of the inner frame 24 and includes an aperture 28 adapted for receipt of the lower portion 405 of the twist-lock 400.

The inner frame 24 is movable relative to the housing 20 in the direction of the axis of rotation of the engagement device 27 and the device 14 also includes a height adjustment mechanism 29 that allows the height of the inner frame 24 to be adjusted relative to the housing 20. In the illustrated form, the height adjustment mechanism 29 takes the form of four hydraulic piston/cylinder arrangements 30 including pistons 31 that are slidably received in cylinders 32. These piston cylinder assemblies extend between base plate 21 and a lower surface of the lower support plate 26.

In the illustrated form the distance between the upper and lower plates is at a fixed spacing by virtue of struts 33. It should be appreciated that in alternative embodiments the lower support plate 26 could be moved vertically, independently of the upper support plate 25, by its own height adjustment arrangement.

The engagement device 27 has an upright U-shaped head 34 and a drive shaft 35 that extends downwardly from the centre of the head 34 and through the lower support plate 26.

The drive shaft 35 is coupled to a drive system 36 that is operative to impart rotational drive to the head 34. The drive system 36 is mounted to an undersurface of the lower support plate 26 and thus both the drive system 36 and engagement device 27 float above the base plate 21 and are height adjustable by actuation of the height adjustment mechanism 29. The drive system 36 is shown in greater detail below with respect to FIG. 9.

Figure 9:
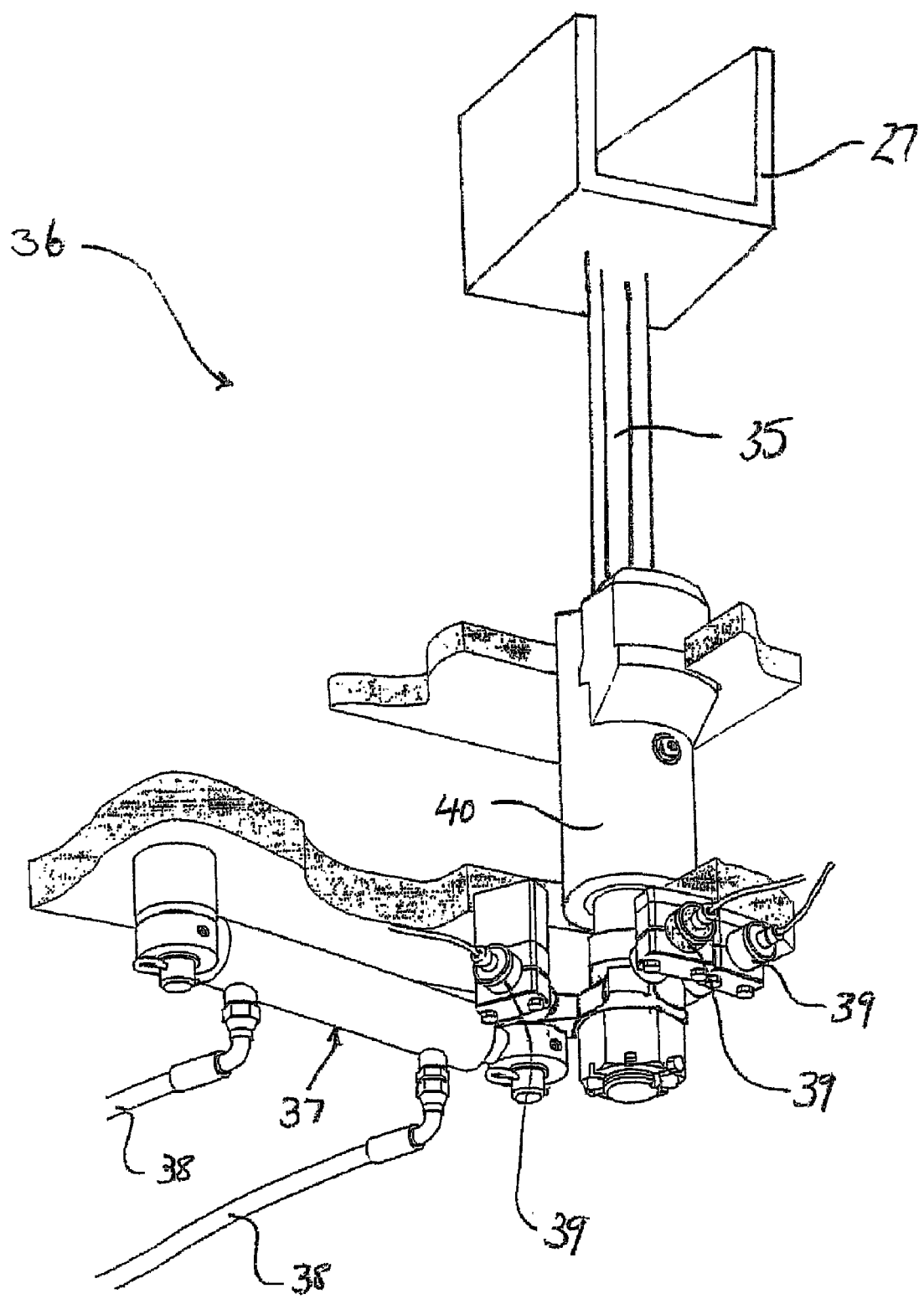
FIG. 9 is a schematic perspective view of an engagement device and drive system for use in the device of FIG. 5.

FIG. 9 shows one of the drive systems 36 connected to a respective one of the engagement devices 20 through drive shaft 35. For ease of illustration, the housing 20 and inner frame 24 in which the engagement device 27 is located, are not shown.

The drive system 36 is in the form of a piston/cylinder assembly 37 that is operative to rotate respective drive shafts 30. Each piston/cylinder assembly 37 is actuated by the hydraulic plant (not shown) via hydraulic lines 38. The assembly 37 is able to selectively rotate the shaft 35 depending on the requirements of the particular twist-lock so to achieve engagement of, or disengagement with, the corner casing 404.

Angular displacement is controlled via a an electrical encoder 39 linked to shaft and controlled by a programmable logic controller (PLC).

In general, there is no international standard for twist-locks and as a result different systems of twist-lock have been developed. Twist-locks may be categorised into three major categories: deck-locks, mid-locks and hatch cones. Each of these different twist-locks fit with a standard corner casing, but otherwise have different external geometries and are designed to rotate different amounts to release from, or engage with, the corner casing. A further significant difference between these three types of twist-lock is the specific arrangements of their body castings and in particular the configuration of the mid-region 407 of the body castings with respect to any relatively rotatable journal portions that they possess.

It should be noted that both deck-locks and mid-locks incorporate a pull-cable or lever to rotate the lower portion 405 with respect to the body casting of the twist-lock 400. Furthermore, hatch cone type twist-locks may incorporate a lever that must be pushed before the hatch cone can be rotated out of the corner casing 404. The manipulation device 14 may incorporate means for actuating these pull-cables and levers which will be described in greater detail below with reference to FIGS. 10 and 11.

Deck-locks incorporate two rotatable journals disposed on upper and lower sides of the body casting of the deck-lock. When a corner casing 404 of the container 402 is positioned on a respective manipulation device 14, the twist-lock is released from the container by the head 34 of the engagement device 27 which rotates the lower journal to which the upper journal is integrally connected. This removal operation can be achieved irrelevant of whether a portion of the weight of the container is on the mid-region 407 of the body casting or not. That is, the mid region 407 of the body casting may be seated on the upper support plate 25 while the twist-lock is unlocked.

A mid-lock, in contrast, may have only one rotatable journal which is disposed on an upper side of the body casting. When a corner casing 404 of a container 402 is positioned on the manipulation device 14, in order to rotate the upper journal, the entire body casting must be rotated, but this cannot be achieved by the head 34 of the engagement device 27 if a portion of the weight of the container is pressing the mid region 407 down onto the upper support plate 25. Therefore, to release a mid-lock from a container 404, the upper support plate 25 must be lowered by the height adjustment arrangement 29 to a height such that the mid region 407 is no longer held in frictional engagement between the corner casing 404 and the upper support plate 25.

Unlike deck-locks and mid-locks, hatch cones are only used to mount containers relative to each other within the hull of a ship. Hatch cones may include a locking lever which needs to be actuated. Some types of Hatch cones, Like mid-locks, can only be released by the head of the engagement device when suspended above the upper support plate 25. Hatch cones that have upper and lower journals are released in same manner at deck-locks.

Accordingly, in use, to remove a twist lock from a corner casing of a shipping container, the twist-lock is located over the manipulation device which has a support plate 25 and engagement device 27 selected to suit that type of twist-lock. The twist lock is received in the manipulation device, with the lower portion 405 extending below the support plate so that it can be engaged by the engagement device. The height of the inner frame 24 of the manipulation device 14 is set so that mid region 407 of the twist-lock either bears on the support plate 25 or is disposed slightly above it. The engagement device, then rotates the lower portion 405 to release the twist-lock which then seats on the support plate ready to be discharged by the guide assembly 16 as will be described below.

Accordingly, to allow a twist lock to contact with the engagement device and to accommodate the range of movement require to enable its release, the aperture 28 in the support plate 25 may need to be quite a complex shape, whilst in other arrangements such as that illustrated in FIGS. 5 to 8, it could merely comprise a slot.

Figure 16:
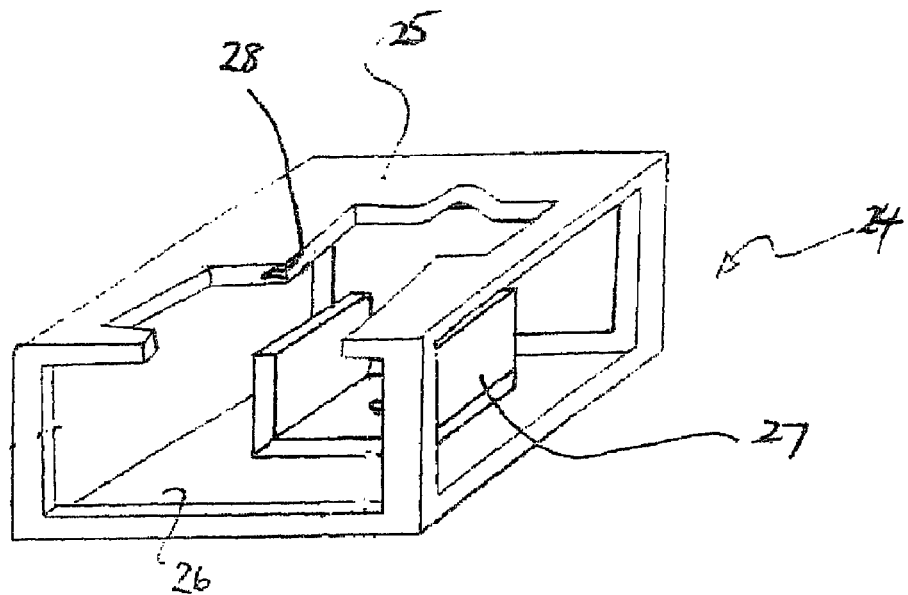
FIG. 16 is a perspective view of a support plate and gripper jaw for a variation of the manipulation device of FIG. 5.
Figure 17:
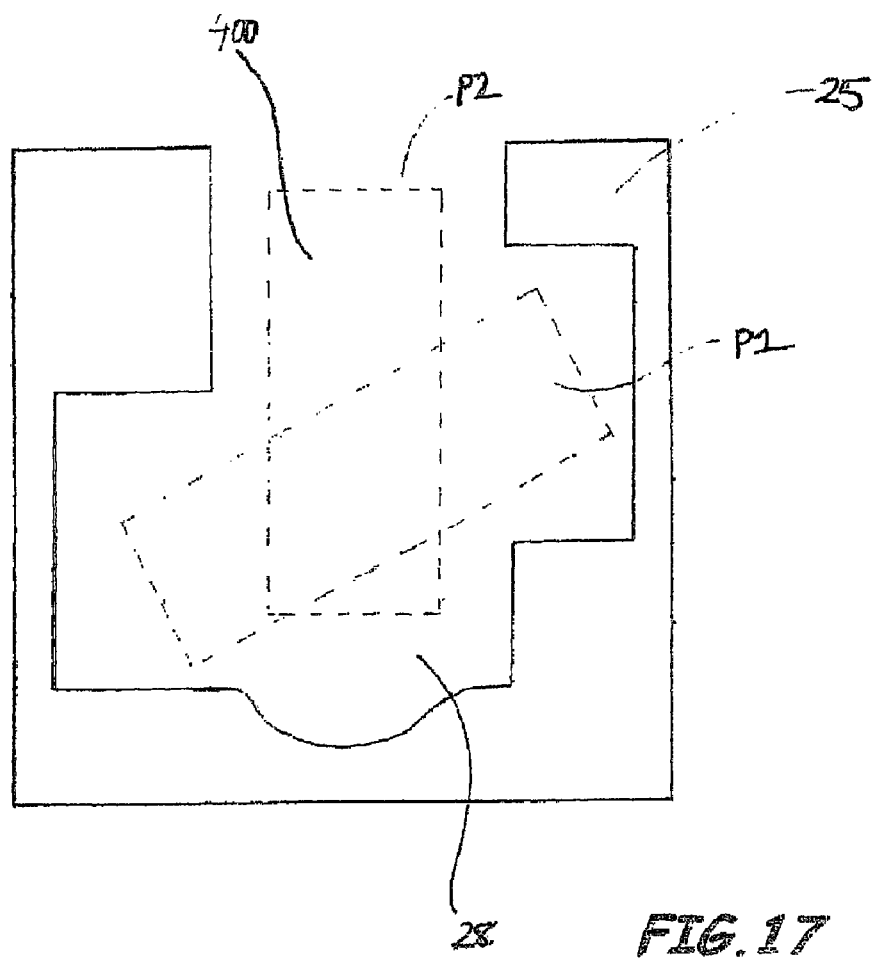
FIG. 17 is a plan view of the device of FIG. 16 showing a twist-lock in an initial position and a rotated position.

A more complex shaped support plate 25 suitable for use with deck-locks is shown in FIGS. 16 and 17. When located on the support plate 25, the lower portion 405 of the twist-lock 400 projects through the recess 28. The recess 28 is configured to allow the twist-lock 400 to rotate in the frame 24, as shown in FIG. 17. The upper support plate 25 allows the frame 24 to support the twist-lock while the lower portion 405 of the twist-lock is rotated.

In the version shown in FIG. 17, the twist-lock is movable between a first position PI and a second position P2, In the first position P1, the twist-lock. 400 is locked to the corner casing 404 of the container 402, while in the second position. P2 the twist lock 400 will freely disengage from the corner casing 404. In the illustrated version, the twist-lock rotates by 45 degrees between the first and second positions. The recess 28 in the upper support plate 25 is specifically shaped to enable the twist-lock to rotate the required amount. The upper support plate 25 is further arranged so that the twist-lock can be removed when it is in the locked position but remains captured within the frame when it is in its release position. Other twist-locks rotate by different amounts and accordingly the upper support plate 25 may be configured differently to accommodate the corresponding range of motions.

As mentioned above, mid-locks usually incorporate a secondary locking means, normally in the form of a pull-cable or lever that must be actuated to allow the journals to twist.

Figure 10:
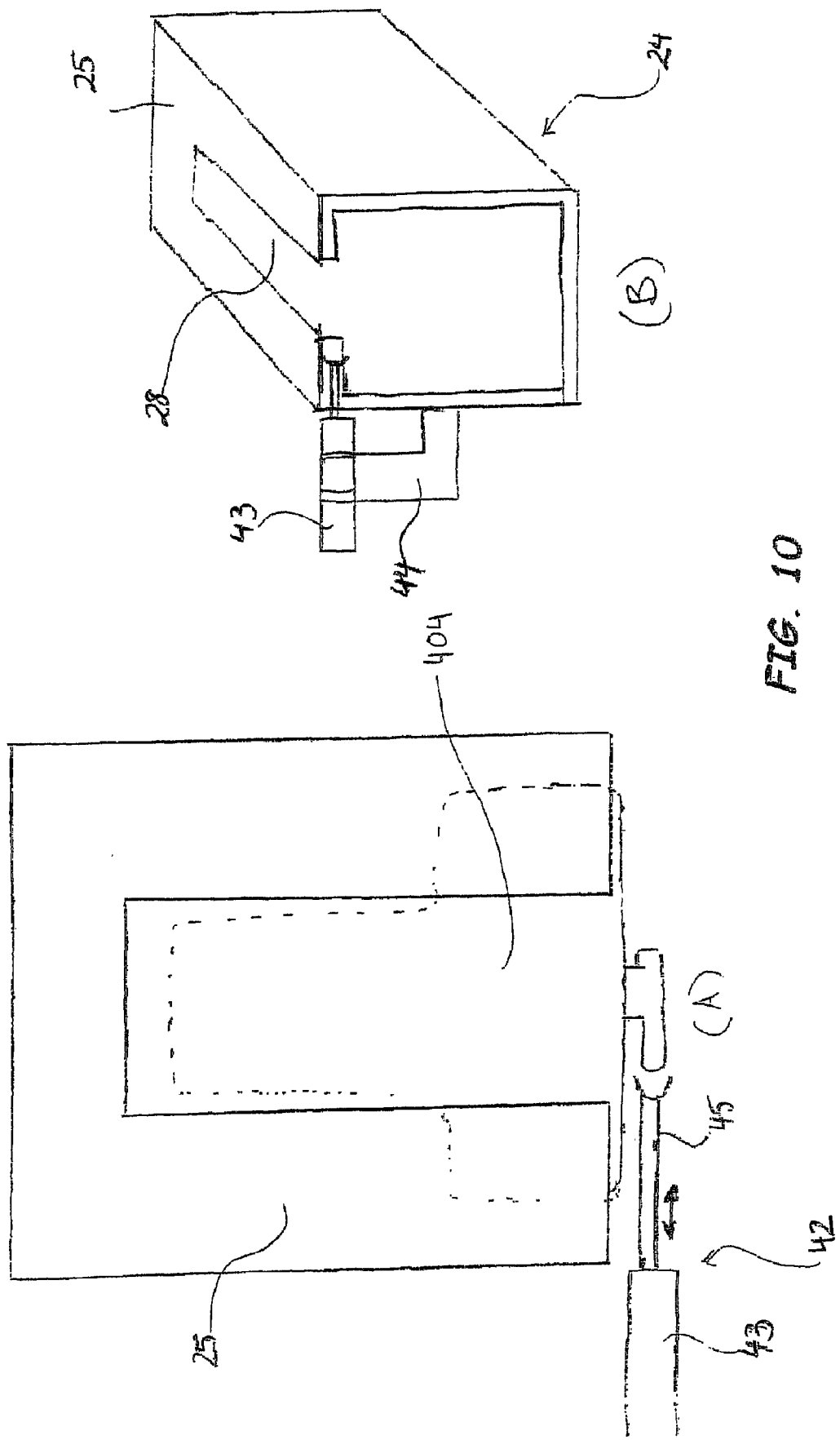
FIGS. 10A and B show a plan view and a perspective view of a variation of the device of FIG. 5 (the drawing has been simplified for clarity) incorporating an actuating arm for actuating the pull cables or levers associated with mid-lock or deck-lock type twist-locks.

In this regard, FIG. 10 schematically depicts a manipulation device 14 (with most parts not shown for clarity) including a lever actuation means 42. This particular manipulation device is suitable for use with deck-locks and mid-locks. The second lever actuation means includes a hydraulic piston/cylinder arrangement 43 mounted on a framework 44 fixed to the device 14. The piston/cylinder arrangement which is driven by the main apparatus power plant is configured to extend and retract a lever engagement shaft 45 to pull/push the pull-cable or lever, respectively. This allows the journals associated with the mid-lock or deck-lock to be rotated by the head 34 of the engagement device 27 to release the twist-lock from the container 402.

Figure 11:
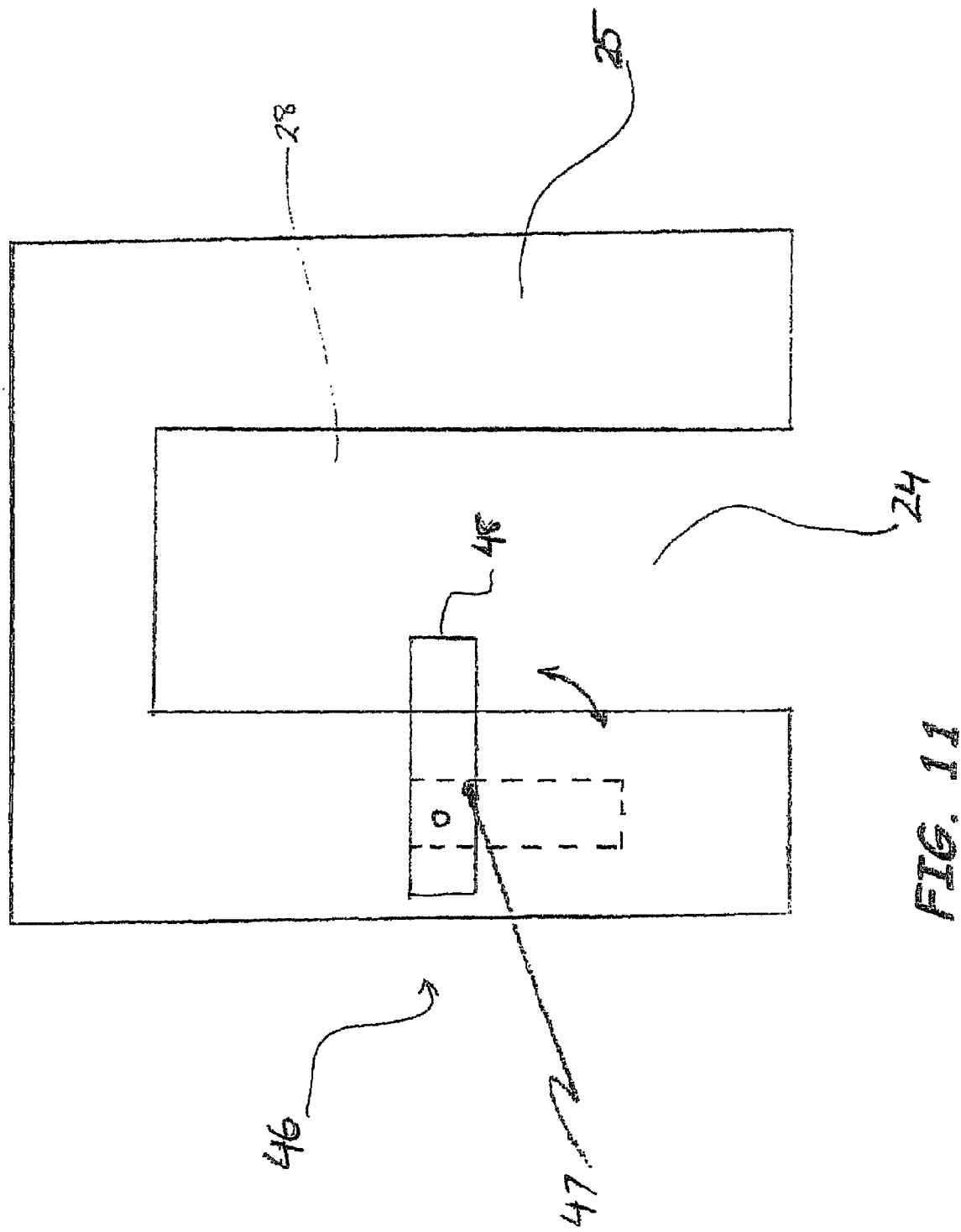
FIG. 11 is a schematic plan view of a further alternative to the device of FIG. 5 incorporating a lever arm for actuating a locking device of a hatch cone type twist-lock.

Referring now to FIG. 11, a simplified version of the upper support plate 25 is shown including lever actuation means 46 mounted on one side of the upper support plate 25. This particular manipulation device is suitable for use with hatch-cone type twist-locks. In this case, the actuation means 46 takes the form of a rotatably mounted arm 47 which can rotate through 90 degrees as shown. The arm is spring-loaded to the position where the end 48 of the arm extends into the support plate recess 21 such that when a hatch cone type twist-lock is moved onto the support plate 25, the arm 47 actuates the lever actuation means 46 so that the hatch cone can be rotated within the respective corner casing 404 and removed from the shipping container 402.

Figure 4:
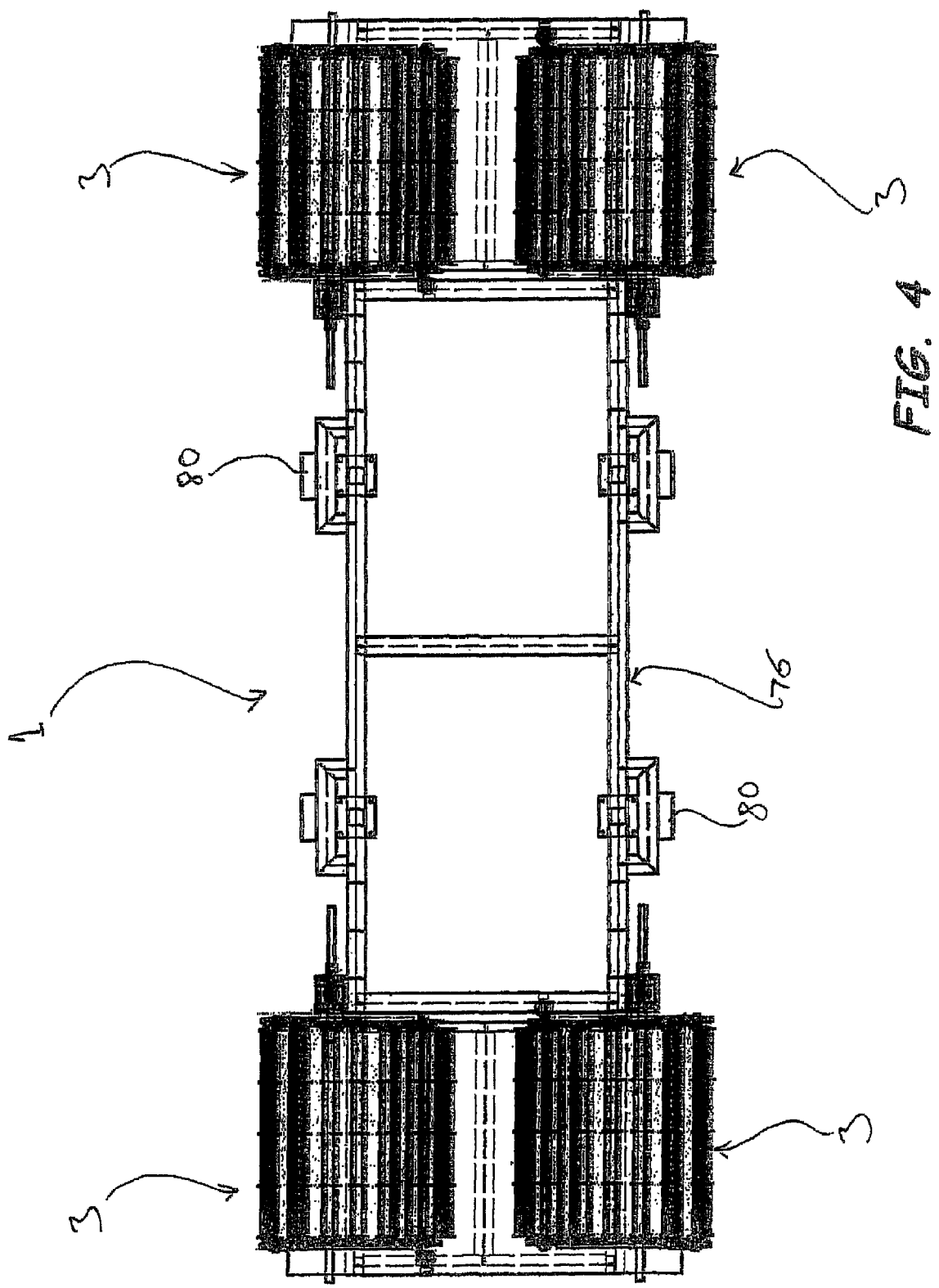
FIG. 4 is a plan view of the apparatus of FIG. 2.

As best illustrated in FIGS. 2 to 4, the each assembly 12 includes a guide assembly 15 to also allow for twist-locks to be fed to, or discharged from, the upper support plate 25 to the storage system 16. The guide assembly 15 includes a track 48 formed from two rails 49 (shown in FIGS. 5 to 8) operative to guide the twist-locks onto and off the upper support plate 25. The twist-locks 400 are moved along the rails 49 by an transport mechanism comprising first and second push rods (50 shown in FIGS. 5 and 51 shown in FIG. 3). The second push rod 51 is formed on the storage system 16 to provide translation of a twist-lock along the rails 49 in an opposite direction to that provided by the first push rod 50.

Figure 12:
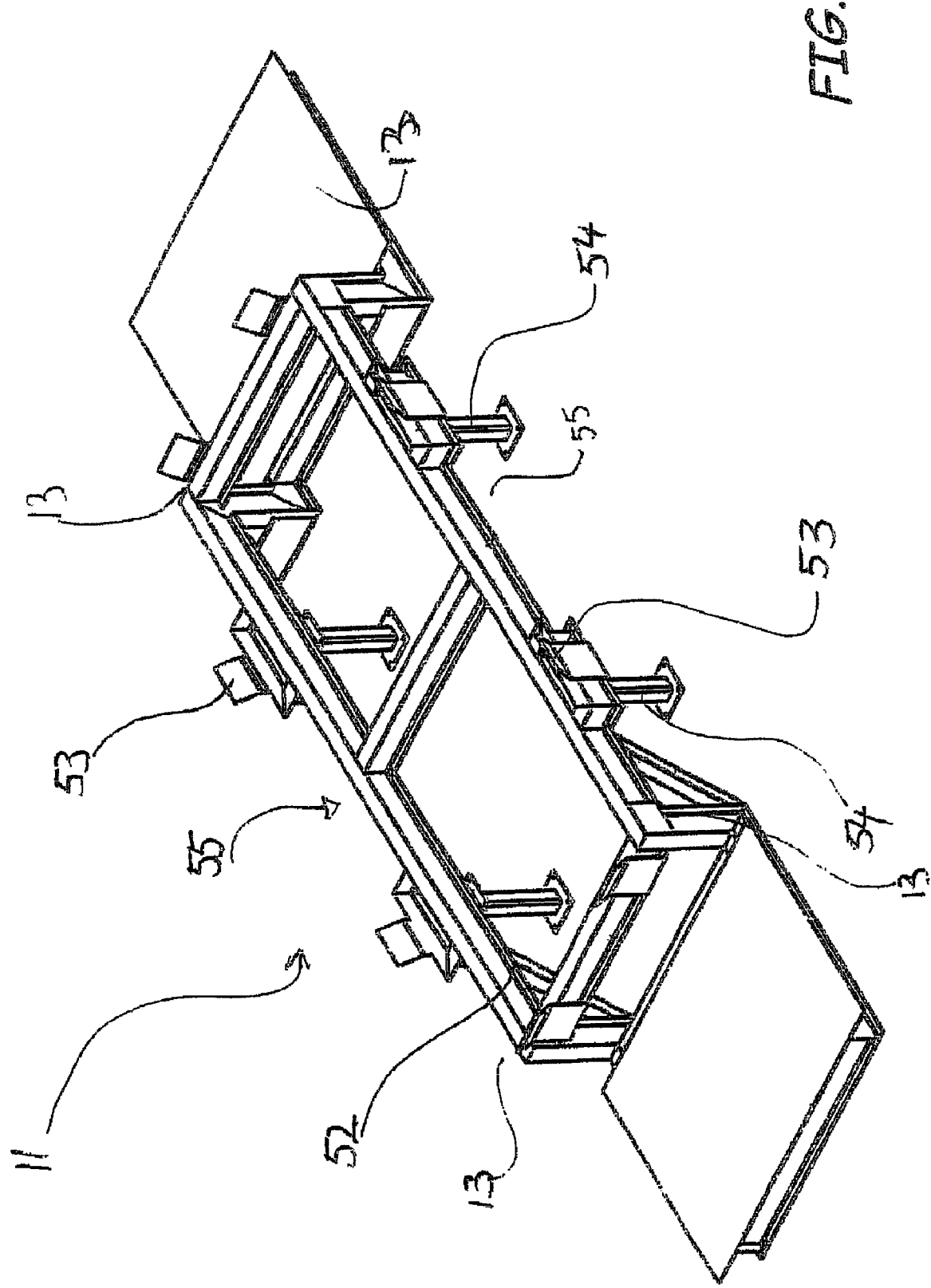
FIG. 12 is a perspective view of a cradle of the apparatus of FIG. 2.

Whilst the manipulation device 14 may be used as a stand alone unit or in conjunction with the guide assembly 15 and the storage system 16, in the illustrated form, it is designed to be incorporated as part of the twist-lock handling apparatus 10 and is secured to the cradle 11, which is best illustrated in FIGS. 12 and 14.

FIG. 12 shows the cradle 11 which is typically made from steel members and includes base 52 and sloping guide members 53 which are arranged to guide the shipping container 402 into position as it is lowered onto the apparatus 10, typically by a quay crane 406 (FIG. 1). The cradle 11 is supported above the ground on a number of legs 54.

The apparatus 10 can be configured to receive two smaller containers transversely, adjacent each other. In this case, a further four manipulation devices 2 are provided at the mid region of the sides of the cradle 11, in addition the handling assemblies disposed at each of the corners 13 of the cradle as shown in FIG. 2. Also, the guide members 53 are adjustable to receive multiple containers.

The cradle further comprises dampeners (not shown) to reduce impact loading when a container is placed on the cradle. The dampeners may take the form of a number of spring/dampening arrangements within the respective legs 54 of the cradle. In one variation, the cradle is formed from two cradle sections, each section supported by its own legs, each leg having a separate spring/dampening arrangement. Advantageously, if two containers are being positioned on the cradle and the crane 406 is carrying the containers in vertically staggered positions then the two cradle sections will provide seating for the respective containers as they reach the respective cradle sections. If the cradle was one integral framework, and the containers being lowered on to it were vertically staggered the whole framework would tilt, resulting in a potentially dangerous situation.

The storage systems 16 of the apparatus are each designed to hold multiple twist-locks. The systems 16 which are illustrated in FIG. 15, form part of each assembly 12 and is associated with the manipulation device 14 of that assembly so as to be able to feed twist-locks from storage onto the support plates 25 of the devices. 14, or alternatively to receive the twist-locks as they are discharged from the devices 14.

The storage systems 16 each comprise a plurality of racks 56 shaped to receive twist-locks. Each rack. 56 includes upper and lower rails (57, 58) as best seen in FIG. 15E that are spaced apart sufficiently to receive a twist-lock therebetween. The racks 56 are mounted transversely on an endless conveyer 59 which is able to rotate under operation of motor 60 to deliver a selected rack 56 adjacent the rails 49 of the guide assembly 15 associated with that storage system 16. When in position, the lower rails 58 of the rack are aligned with rails" 49 of the manipulation device so that the twist-locks can move freely between the rack and onto the rails 58 of the guide assembly under the influence of either of the push-rods 50 or 51. Each rack 56 may also be arranged to be removable from the system to form a removable storage magazine.

Each of the storage systems 16 is designed with appropriate proximity sensors so that the conveyor 59 is able to rotate when a rack 56 that is aligned with a manipulation device rail is either full or empty. In this way, the system is able to index the next available rack, thereby allowing the storage system to automatically utilise all of the racks in the system.

The twist-locks are able to move along the racks and the rails by the first and second hydraulically powered push rods (50, 51). As best illustrated in FIG. 15A, the second push rod 51 is mounted on a sub-frame that extends above the storage system thereby having access to all of the twist-locks in the rack that is in use.

In the illustrated foam the storage systems 16 are disposed outside the apparatus cradle 11 although it is to be appreciated that it may be located within the confines of the cradle so as to make the apparatus more compact.

In another alternative arrangement, it is envisaged that one central storage facility is provided and a transport mechanism is provided between the/each manipulation device and the central storage facility to transport twist-locks therebetween.

In use the apparatus 10 allows for remote handling of the twist-locks. The apparatus merely needs to register the type of twist-lock being used in the PLC. This can he done automatically on insertion of the appropriate manipulation devices 14 (or replaceable component parts such as the support plate 25 or engagement device 27) in the apparatus 10 through a scanning system or by manual input. Once the type of twist-lock is registered, the apparatus 10 can be controlled through the hydraulic plant which activates the drive systems 36 and the push rods (50, 51). This can he done at any convenient point such as in the crane cabin or by a hydraulic control located adjacent the apparatus.

One of the many advantages of the design of the apparatus 10 is that it is able to engage with and operate a variety of twist-locks, including hatch-cones, semi-automatic twist-locks and mid-locks. It can do this via the interchangeable twist-lock specific manipulation devices 14. These devices 14 all have the same external geometry allowing them to fit into the allotted space in the twist-lock handling apparatus 10. New devices 14 can be developed as new types of twist-locks are brought onto the market. Alternatively, merely the engagement devices 27 or support plates 25 are interchangeable to suit a variety of twist-locks.

The apparatus 10 may be designed so that the manipulation devices, the engagement devices 27 and/or the upper support plates 25 are manually interchangeable. Alternatively, this process may be automated through the use of an indexing system wherein the manipulation devices, engagement devices or support plates are mounted in a magazine or on a carousel wherein they can be moved in to and out of engagement with the apparatus. Typically, this process could be controlled through the PLC by the operator.

In an alternative arrangement, a universal manipulation device could be used that is able to cater for different twist lock geometries and different amounts of rotation. In one form of this arrangement, the engagement device incorporates an adjustable chuck rather than a device of fixed dimensions to cater for the different twist-lock dimensions. Again this chuck may be operative to adjust under control of the PLC when the type of twist-lock is registered with the PLC.

Figure 18:
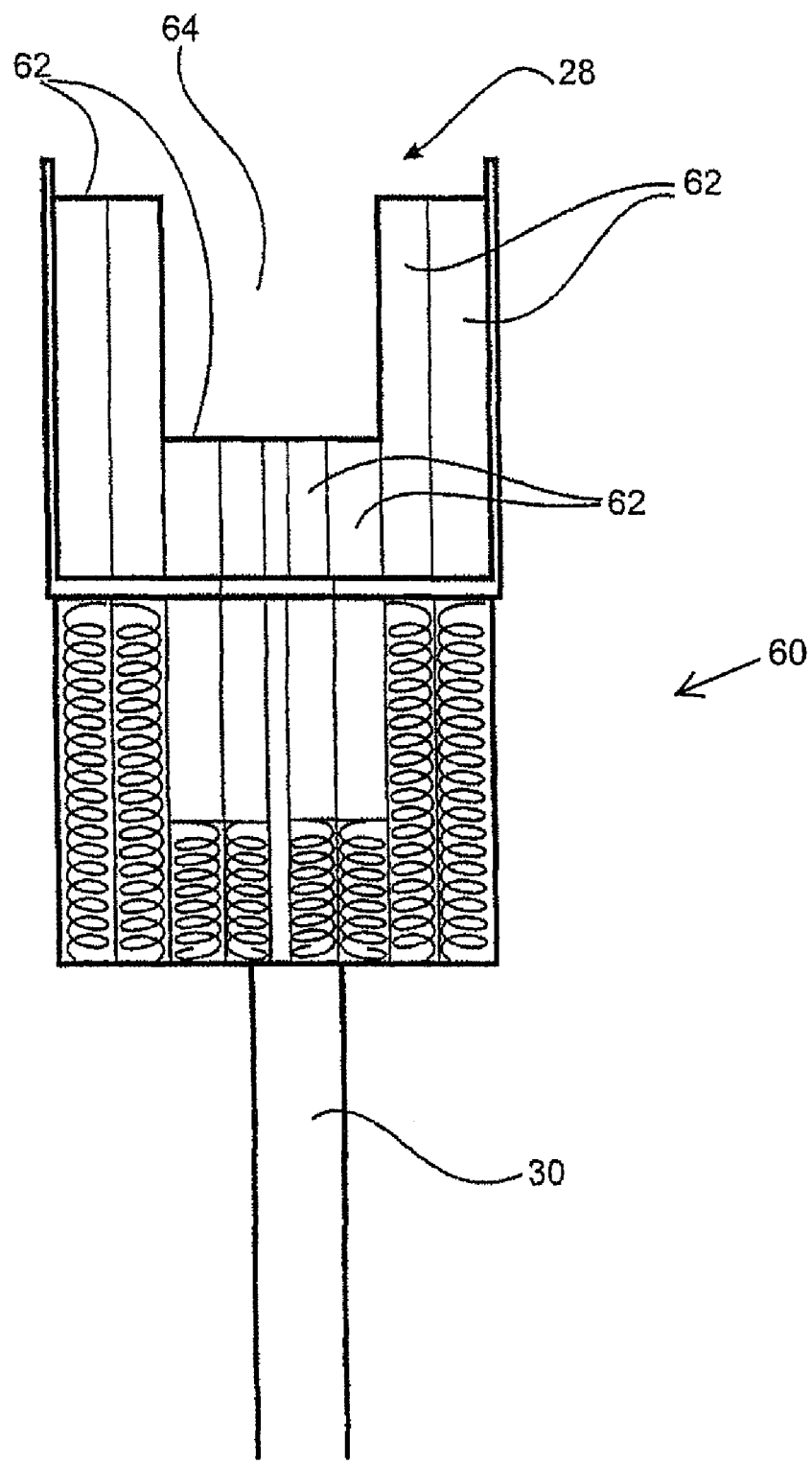
FIG. 18 is a side view of an adjustable jaw for use in a variation of the manipulation device of FIG. 5.
Figure 19:
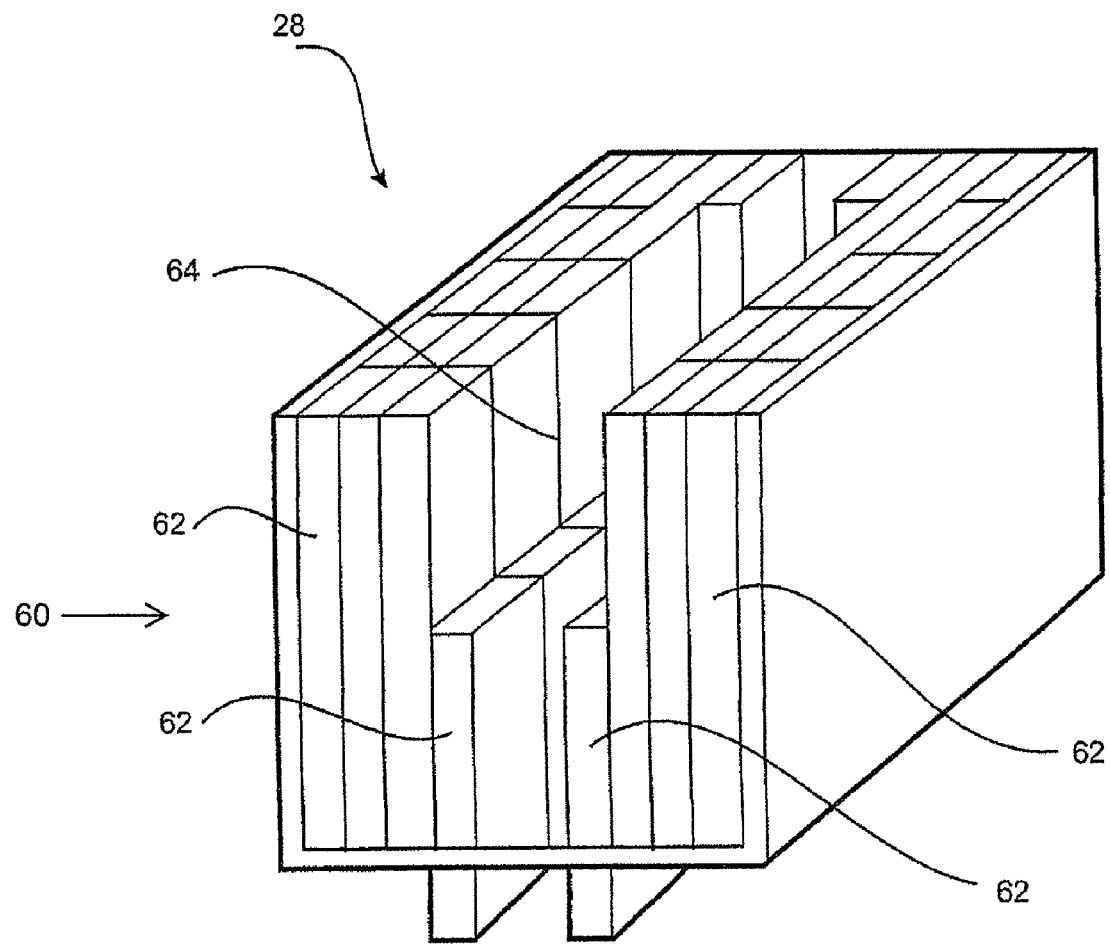
FIG. 19 is a perspective view of the device of FIG. 18.
Figure 20:
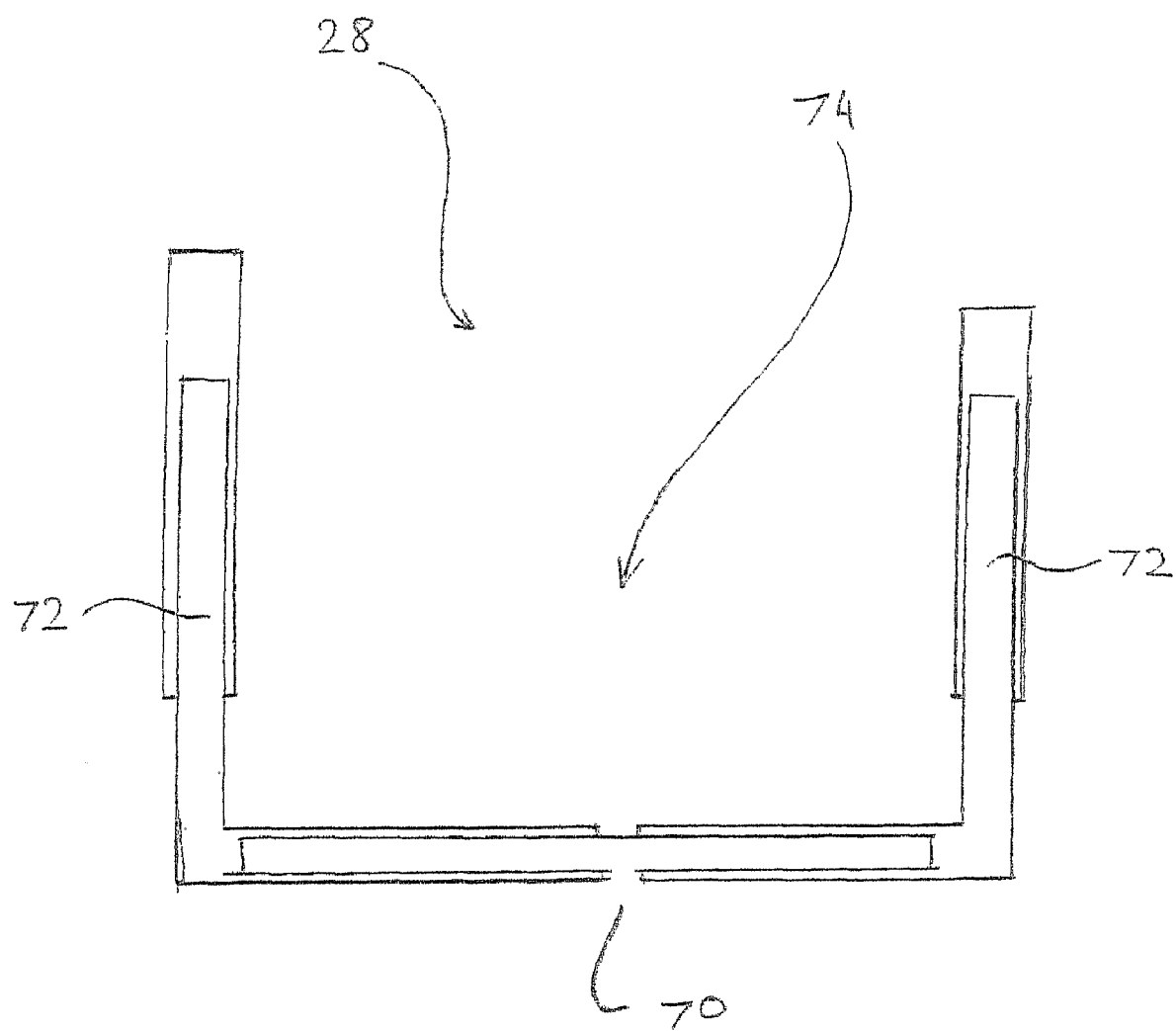
FIG. 20 is a side view of an alternative adjustable jaw for the manipulation device of FIG. 5.

FIGS. 18 to 20 illustrate a further alternative version of the engagement device 27. In both these forms, the engagement device is adjustable so as to be able to cater for a range of twist-locks 400.

The engagement device 60 as shown in FIGS. 18 and 19 comprises a plurality of columns or elements 62 that are moveable between an extended and a retracted position. Each of the columns 62 are spring loaded so as to be biased into their extended position. By moving a portion of the columns into their retracted position, a recess 64 is formed which is operative to receive the twist-lock. With this arrangement, the columns 62 may be retracted merely by forcing the twist-lock against the ends 66 of the columns 62.

In the embodiment shown in FIG. 20, the engagement device 68 comprises a base member 70 and a pair of opposite side members 72. Both the base member and the side members are adjustable in length so as to allow for adjustment of both the depth and the width of the recess 74.

Accordingly, the design allows for automation of twist-lock handling of containers that are being loaded or unloaded from shipping containers. The apparatus reduces cycle times as compared to existing practices that have manual handling of the twist-locks on the quay. The apparatus can handle high through put of the containers without requiring intervention by dockside workers thereby not only improving efficiency on the wharf but providing safer working environment.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive. For example, the system may include electric or pneumatic actuators rather than hydraulic actuators. In another variation, the entire system may be movable as part of or carried by a vehicle such as a large truck or a vehicle running along rails at the quay. Sensor devices other than those described may be used as are known by those skilled in the art and as are suitable for the relevant purposes.

The invention claimed is:

1. A manipulation device for either securing a twist-lock to a shipping container or releasing the twist-lock therefrom or both, the device comprising:
    engagement means operative to engage and rotate at least a portion of the twist-lock so as to secure the twist-lock in the shipping container or to release the twist-lock therefrom;
    a support member disposed above the engagement means, the support member being arranged to receive and support a mid region of a twist-lock whilst allowing a lower portion of the supported twist-lock to project below the member to be engagable with the engagement means;
    a housing and a frame incorporating the engagement means and the support member, wherein the frame is disposed within the housing;
    said support member being in the form of a plate incorporating at least one aperture allowing the lower portion of the supported twist-lock to project below the plate;
    wherein the frame is movable relative to the housing in the direction of the axis of rotation of the engagement means such that the support member is movable in the direction of the axis of rotation of the engagement means.

2. A manipulation device according to claim 1, wherein the engagement means is movable in the direction of the axis of rotation of the engagement means.

3. A manipulation device according to claim 2, wherein both the engagement means and the support member is movable in the direction of the axis of rotation of the engagement means.

4. A manipulation device according to claim 1, wherein the engagement means is movable relative to the support member in the direction of the axis of rotation of the engagement means.

5. A manipulation device according to claim 1, wherein the support member is interchangeable with at least one other support member of different shape to accommodate different types of twist-locks.

6. A manipulation device according to claim 1, wherein the engagement means is interchangeable with at least one other engagement means of different shape to accommodate different types of twist-locks.

7. A manipulation device according to claim 1, wherein the engagement means is able to be reconfigured to accommodate different types of twist-locks.

8. A manipulation device according to claim 7, wherein the engagement means comprises a plurality of elements that are movable between a retracted and extended position and wherein a recess operative to receive the twist-lock is formed on retracting selected areas of the elements.

9. A manipulation device according to claim 8, wherein the engagement means comprises a base plate and side plates, wherein at least one of the base plates or the side plates are extendable to vary the size or shape of a recess for receiving a twist-lock.

10. A manipulation device according to claim 1, wherein the engagement means is in the form of jaws which are operable to grip the twist-lock disposed in the manipulation device.

11. A manipulation device according to claim 1, further comprising an actuator operative to release a locking mechanism disposed on the twist-lock.

12. A manipulation device for either securing a twist-lock to a shipping container or releasing the twist-lock therefrom or both, the device comprising:
    engagement means operative to engage and rotate at least a portion of the twist-lock so as to secure the twist-lock in the shipping container or to release the twist-lock therefrom;
    a support member disposed above the engagement means, the support member being arranged to receive and support a mid region of a twist-lock whilst allowing a lower portion of the supported twist-lock to project below the member to be engagable with the engagement means;
    a housing and a frame incorporating the engagement means and the support member, wherein the frame is disposed within the housing;

said support member being in the form of a plate incorporating at least one aperture allowing the lower portion of the supported twist-lock to project below the plate;

wherein the manipulation device further comprises a height adjustment assembly operative to move the frame relative to the housing in the direction of the axis of rotation of the engagement means such that the engagement means is movable relative to the support member in the direction of the axis of rotation of the engagement means.

13. A manipulation device according to claim 12, wherein the support member is movable in the direction of the axis of rotation of the engagement means.

14. A manipulation device according to claim 12, wherein the height adjustment assembly is one or more hydraulic piston cylinder assemblies.

15. A twist-lock handling assembly, comprising: a manipulation device for either securing a twist-lock to a shipping container or releasing the twist-lock therefrom or both, the device comprising engagement means operative to engage and rotate at least a portion of the twist-lock so as to secure the twist-lock in the shipping container or to release the twist-lock therefrom;

a support member disposed above the engagement means, the support member being arranged to receive and support a mid region of a twist-lock whilst allowing a lower portion of the supported twist-lock to project below the member to be engagable with the engagement means;

a housing and a frame incorporating the engagement means and the support member, wherein the frame is disposed within the housing;

said support member being in the form of a plate incorporating at least one aperture allowing the lower portion of the supported twist-lock to project below the plate;

wherein the frame is movable relative to the housing in the direction of the axis of rotation of the engagement means such that the support member is movable in the direction of the axis of rotation of the engagement means, and a guide assembly for guiding twist-locks into and out of engagement with the manipulation device.

16. A twist-lock handling assembly according to claim 15, wherein the guide assembly includes a track along which twist-locks are able to move whilst being stably supported.

17. A twist-lock handling assembly as defined in claim 16, wherein the guide assembly further comprises a transport mechanism for moving the twist-lock along the track.

18. A twist-lock handling assembly according to claim 15, further comprising storage means for storing twist-locks discharged from the manipulation device or for obtaining stored twist-locks from the storage means for feeding to the manipulation device, wherein twist-locks are moved between the manipulation device and the storage means via the guide assembly.

19. A twist-lock handling assembly according to claim 18, wherein the storage means comprises at least one rack for receiving a plurality of twist-locks.

20. A twist-lock handling assembly according to claim 19, wherein the storage means comprises a plurality of racks mounted on a conveyor operative to move the racks into and out of register with the guide assembly.

21. A twist-lock handling assembly according to claim 19, wherein the or each rack is in the form of a removable storage magazine.

22. A twist-lock handling assembly according to claim 15, further comprising a drive arrangement operative to rotate the engagement means.

23. An apparatus for either securing twist-locks to shipping containers or releasing them therefrom or both, the apparatus comprising: a cradle adapted to receive at least one shipping container and at least one manipulation device operative to secure a twist-lock to the shipping container or release it therefrom, the manipulation device comprising engagement means operative to engage and rotate at least a portion of the twist-lock so as to secure the twist-lock in the shipping container or to release the twist-lock therefrom;

a support member disposed above the engagement means, the support member being arranged to receive and support a mid region of a twist-lock whilst allowing a lower portion of the supported twist-lock to project below the member to be engagable with the engagement means;

a housing and a frame incorporating the engagement means and the support member, wherein the frame is disposed within the housing;

said support member being in the form of a plate incorporating at least one aperture allowing the lower portion of the supported twist-lock to project below the plate;

wherein the frame is movable relative to the housing in the direction of the axis of rotation of the engagement means such that the support member is movable in the direction of the axis of rotation of the engagement means, the manipulation device being registrable with at least one twist-lock mounting location on the shipping container;

wherein the at least one manipulation device is removable from the apparatus so as to enable substitution of the device with at least one other said manipulation device to accommodate different types of twist-locks.

24. An apparatus according to claim 23, further comprising a plurality of manipulation devices mounted to the cradle.

25. An apparatus according to claim 23, wherein the apparatus is configured to allow the at least one manipulation device to move relative to the cradle to at least two twist-lock mounting locations on a shipping container.

26. An apparatus according to claim 23, wherein the cradle is substantially rectangular and is adapted to receive one larger container or two smaller containers one end of each being adjacent each other.

27. An apparatus according to claim 26, wherein the cradle includes dampeners operative to reduce impact loading on the cradle induced on the locating of shipping containers on the cradle.

28. An apparatus according to claim 26, wherein the cradle is formed from first and second independent sections, each section being arranged to receive a container of predetermined size.

29. An apparatus according to claim 28, wherein each cradle section includes dampeners operative to reduce impact loading on that cradle section induced on the locating of shipping containers on that cradle section.

30. An apparatus as defined in claim 23, wherein the cradle further comprises guiding elements for guiding the respective container or containers into position on the cradle.

31. An apparatus for either securing twist-locks to shipping containers or releasing them therefrom or both, the apparatus comprising: a cradle adapted to receive at least one shipping container and at least one manipulation device operative to secure a twist-lock to the shipping container or release it therefrom, the manipulation device being registrable with at least one twist-lock mounting location on the shipping container, wherein the manipulation device comprises engagement means operative to engage and rotate at least a portion of the twist-lock so as to secure the twist lock in the shipping container or to release it therefrom;

a support member disposed above the engagement means, the support member being arranged to receive and support a mid region of a twist-lock whilst allowing a lower portion of the supported twist-lock to project below the member to be engagable with the engagement means;

a housing and a frame incorporating the engagement means and the support member, wherein the frame is disposed within the housing;

said support member being in the form of a plate incorporating at least one aperture allowing the lower portion of the supported twist-lock to project below the plate;

wherein the frame is movable relative to the housing in the direction of the axis of rotation of the engagement means such that the support member is movable in the direction of the axis of rotation of the engagement means.

32. An apparatus according to claim 31, wherein the at least one manipulation device is removable from the apparatus so as to enable substitution of the device with at least one other said manipulation device to accommodate different types of twist-locks.

* * * * *